United States Patent
Hemstock

(10) Patent No.: US 12,023,629 B2
(45) Date of Patent: Jul. 2, 2024

(54) STACKED-PLATE FILTERS, FILTER PLATES, AND METHODS FOR A STACKED-PLATE FILTER

(71) Applicant: SPECIALIZED DESANDERS INC., Calgary (CA)

(72) Inventor: Christopher A. Hemstock, Calgary (CA)

(*) Notice: Subject to any disclaimer, the term of this patent is extended or adjusted under 35 U.S.C. 154(b) by 214 days.

(21) Appl. No.: 16/999,843

(22) Filed: Aug. 21, 2020

(65) Prior Publication Data

US 2022/0054984 A1     Feb. 24, 2022

(51) Int. Cl.
    *B01D 63/08*           (2006.01)
    *B01D 25/21*           (2006.01)
    (Continued)

(52) U.S. Cl.
    CPC ....... *B01D 63/0821* (2022.08); *B01D 25/215* (2013.01); *B01D 29/46* (2013.01);
    (Continued)

(58) Field of Classification Search
    CPC .. B01D 63/082; B01D 63/084; B01D 25/215; B01D 29/46; B01D 2221/04; B01D 2313/20; B01D 2313/12; B01D 2313/125; B01D 2313/13; B01D 2315/08; E21B 21/065
See application file for complete search history.

(56) References Cited

U.S. PATENT DOCUMENTS

| | | | |
|---|---|---|---|
| 1,643,299 A * | 9/1927 | Furness | B01D 29/46 210/488 |
| 1,849,582 A * | 3/1932 | Bror | B01D 29/46 210/357 |

(Continued)

FOREIGN PATENT DOCUMENTS

| | | |
|---|---|---|
| AU | 2017376972 | 6/2018 |
| CN | 203598568 | 5/2014 |

(Continued)

OTHER PUBLICATIONS

International Preliminary Report on Patentability received in corresponding PCT Application No. PCT/CA2017/051484 dated Apr. 4, 2019, 26 pages.

(Continued)

*Primary Examiner* — Liam Royce
(74) *Attorney, Agent, or Firm* — Parlee McLaws LLP

(57) ABSTRACT

Stacked-plate filters may include a plurality of stacked filter plates with small gaps therebetween. The present disclosure provides a stacked-plate filter apparatus comprising a plurality of filter plates stacked along a longitudinal axis with the filter plates substantially parallel. Each filter plate has a respective outer rim, first face and second face. Each of the filter plates defines a respective opening therethrough. The outer rim forms a first peripheral edge at the first face and a second peripheral edge at the second face. The first peripheral edge is radially misaligned from the second peripheral edge to form an offset gap interface for each adjacent pair of (Continued)

the filter plates. For each of the filter plates, the respective outer rim may be tapered from the first face to the second face to provide the radial misalignment.

13 Claims, 10 Drawing Sheets

(51) Int. Cl.
*B01D 29/46* (2006.01)
*E21B 21/06* (2006.01)

(52) U.S. Cl.
CPC ...... *B01D 2221/04* (2013.01); *B01D 2313/13* (2013.01); *B01D 2313/2011* (2022.08); *E21B 21/065* (2013.01)

(56) References Cited

U.S. PATENT DOCUMENTS

| | | | |
|---|---|---|---|
| 1,964,218 A * | 6/1934 | Schargorodsky | B01D 29/44 210/488 |
| 2,227,344 A | 12/1940 | Hartmann | |
| 3,217,888 A * | 11/1965 | Fuchs | B01D 24/08 210/318 |
| 3,473,668 A | 10/1969 | Bunyard et al. | |
| 3,645,298 A | 2/1972 | Roberts et al. | |
| 4,517,089 A | 5/1985 | Arnaud | |
| 4,636,309 A * | 1/1987 | Bellhouse | B01D 63/082 210/321.72 |
| 4,686,041 A | 8/1987 | Van den Berg et al. | |
| 4,721,567 A | 1/1988 | Uram | |
| 4,726,900 A | 2/1988 | Keskinen et al. | |
| 4,744,901 A | 5/1988 | Drori | |
| 4,753,731 A | 6/1988 | Drori | |
| 4,882,050 A | 11/1989 | Kopf | |
| 4,966,702 A | 10/1990 | Drori | |
| 5,173,195 A | 12/1992 | Wright et al. | |
| 5,292,479 A | 3/1994 | Haraga et al. | |
| 5,341,848 A | 8/1994 | Laws | |
| 5,935,424 A | 8/1999 | Dyer et al. | |
| 6,601,460 B1 | 8/2003 | Matema | |
| 6,793,177 B2 | 9/2004 | Bonutti | |
| 7,210,585 B2 | 5/2007 | Hajek | |
| 8,794,574 B2 | 8/2014 | Lang | |
| 8,881,994 B2 | 11/2014 | Wetzel et al. | |
| 9,308,987 B1 | 4/2016 | Riggins | |
| 9,895,634 B2 | 2/2018 | Selwyn | |
| 10,807,020 B2 | 10/2020 | Hemstock | |
| 10,967,305 B2 | 4/2021 | Hemstock | |
| 2011/0139893 A1 | 6/2011 | Wetzel et al. | |
| 2015/0021257 A1 | 1/2015 | Selwyn | |
| 2015/0144546 A1 | 5/2015 | Iwasaki | |
| 2018/0161705 A1 | 6/2018 | Hemstock | |
| 2018/0345180 A1 | 12/2018 | Hemstock | |

FOREIGN PATENT DOCUMENTS

| | | | |
|---|---|---|---|
| EP | 1854530 | | 11/2007 |
| FR | 872264 | | 6/1942 |
| GB | 312944 | A * | 6/1929 |
| GB | 336122 | | 10/1930 |
| GB | 1022293 | | 3/1966 |
| WO | 9221425 | | 12/1992 |
| WO | 2013128171 | | 9/2013 |
| WO | 2017084657 | | 5/2017 |
| WO | 2018107276 | | 6/2018 |

OTHER PUBLICATIONS

International Search Report received in corresponding PCT Application No. PCT/CA2017/051484 dated Feb. 27, 2018, 3 pages.
Written Opinion of the International Searching Authority received in corresponding PCT Application No. PCT/CA2017/051484 dated Feb. 27, 2018, 5 pages.
International Search Report received in corresponding PCT Application No. PCT/CA2018/050824 dated Sep. 14, 2018, 3 pages.
Written Opinion of the International Searching Authority received in corresponding PCT Application No. PCT/CA2018/050824 dated Sep. 14, 2018, 5 pages.
International Search Report received in corresponding PCT Application No. PCT/CA2018/050822 dated Aug. 9, 2018, 3 pages.
Written Opinion of the International Searching Authority received in corresponding PCT Application No. PCT/CA2018/050822 dated Aug. 9, 2018, 4 pages.
Canadian Examiner's Report issued on Canadian Patent Application No. 3,090,749, dated Jun. 1, 2022.

* cited by examiner

STACKED-PLATE FILTERS, FILTER PLATES, AND METHODS FOR A STACKED-PLATE FILTER

FIELD OF THE DISCLOSURE

The present disclosure relates generally to filtering devices. In particular, the disclosure relates to stacked-plate filtering devices and related methods for removing particulates from an input fluid stream.

BACKGROUND

Production from wells in the oil and gas industry may include fluids and particulates such as sand. These particulates could originate from multiple sources including but not limited to: the formation from which the hydrocarbon is being produced, materials used in hydraulic fracturing, fluid loss material from drilling mud or fracturing fluids, precipitates and gels formed from chemical stimulation or secondary recovery methods and/or a hydrocarbon precipitate due to phase change of produced hydrocarbons caused by changing conditions at the wellbore. As the particulates are produced, erosion and plugging of production equipment can occur. In a typical start-up after stimulating a well by fracturing, for example, the stimulated well may produce sand until the well has stabilized. The sand production may last for several months after production commences. Some wells may produce sand for a much longer period of time.

Erosion of the production equipment can be severe enough to cause catastrophic failure. High fluid stream velocities are typical and are even purposefully designed to encourage the elutriation of particulates up the well to surface. An erosive failure is a serious safety and environmental issue for the well operator. A failure, such as a breach of high pressure piping or equipment, may release uncontrolled high velocity flow of fluid, the energy and properties of which may be hazardous to service personnel and the environment. Cleanup and repair may be expensive in both the remediation and loss of production.

Particulates may also contaminate surface equipment and production fluids. Contamination may impair the normal operation of the oil and gas gathering systems and process facilities.

Desanding devices may be employed for removing sand from the production fluid stream. Some conventional desanding devices use screen filters for removing particulates from an input fluid stream. However, these prior-art desanding devices have drawbacks, such as low or even marginal tolerance for pressure drop and such devices may collapse at low pressure. Such desanding devices may, in general, fail at pressures considerably lower than the maximum allowable working pressure of a vessel that contains the filter. Another drawback of such devices is that the screens thereof may easily become plugged or clogged due to accumulation of particulates thereon.

Stacked-plate filters are designed to form annular pockets between adjacent filter plates or discs for receiving and holding foreign particulates separated from the fluid. Stacked-plate filters may also be referred to as multiple-disc filters. Stacked-plate filters have a number of important advantages over other types of filters, such as the apertured screen type. One noted advantage is the higher quantities of foreign particulates which the multiple-disc type filter is capable of removing and retaining as compared to the apertured-screen filter. Another noted advantage is the higher resistance to rupture that the stacked-plate filter has compared to the ubiquitous apertured-screen filter.

Several challenges to filtering in hydrocarbon-processing fields include: high costs; high pressured resistance and operating duration before a clogging and need for cleaning; and high pressure drop across the device. Desanding or other particulate removal processes in the hydrocarbon-processing fields may require removing very fine particulates, and such fine particulates may present additional challenges. The finer the particulates that must be filtered, the closer filter plates in the stacked-plate filter must be placed, which may contribute to pressure drop issues. The closer together that the stacked filter plates are spaced, the smaller the particulate that can be excluded from the space between the filter plates. However, a problem can arise in spacing the filter plates very close together when filtering liquid. As filter plate spacing decreases, for a given fluid flow rate, the pressure drop may increase beyond that of theoretical models. As a result, the characteristics of liquid, as the process fluid, may behave significantly different from gaseous fluids.

SUMMARY

According to an aspect, there is provided a stacked-plate filter apparatus comprising: a plurality of filter plates stacked along a longitudinal axis with the filter plates substantially parallel, each of the filter plates having a respective outer rim, a respective first face and a respective second face opposite the first face, and each of the filter plates defining a respective opening therethrough from the first face to the second face, the respective outer rim forming a respective first peripheral edge at the first face and a respective second peripheral edge at the second face, wherein the filter plates are substantially parallel and spaced apart to define, for each adjacent pair of the filter plates, a respective inlet gap for flow of fluid therebetween from the first and second peripheral edges to the openings of the filter plates, and the first peripheral edge is radially misaligned from the second peripheral edge to form an offset gap interface for each adjacent pair of the filter plates.

In some embodiments, for each of the filter plates, the respective outer rim is tapered from the first face to the second face.

In some embodiments, the taper is a linear taper.

In some embodiments, the first faces of the filter plates are each oriented toward a same axial direction.

In some embodiments, for each of the filter plates, the respective first peripheral edge is radially misaligned from the respective second peripheral edge by an offset distance of 500 micrometers or less (e.g. 5 to 10 micrometers or less).

In some embodiments, a thickness of the inlet gap between each adjacent pair of the filter plates is 1000 micrometers or less (e.g. 10 to 20 micrometers or less).

In some embodiments: the offset distance is approximately half of the thickness of the inlet gap.

In some embodiments, for each of the filter plates, the filter plate is generally washer shaped and comprises an inner rim defining the opening.

In some embodiments, the inner rim defines one or more keyway notches therein.

In some embodiments, the inner rim defines a generally circular shape with at least one extension that extends radially inward, each extension defining a respective one of the one or more keyway notches therein.

In some embodiments, the apparatus further comprises a mandrel, the filter plates being mounted over the mandrel such that the mandrel extends through the openings of the filter plates.

In some embodiments, the mandrel comprises a perforated pipe and at least one longitudinally extending key protruding from an outer periphery of the perforated pipe.

In some embodiments, the perforated pipe defines a plurality of perforations arranged and aligned in axially extending columns spaced apart about a circumference of the perforated pipe.

According to another aspect, there is provided a filter plate for a stacked-plate filter, comprising: a first face and a second face opposite the first face; an outer rim extending about an outer periphery of the filter plate and extending from the first face to the second face; and the filter plate defining an opening therethrough from the first face to the second face; wherein the outer rim forms a respective first peripheral edge at the first face and a respective second peripheral edge at the second face, the first peripheral edge being radially misaligned from the second peripheral edge.

In some embodiments, the outer rim is tapered from the first face to the second face.

In some embodiments, the first peripheral edge is radially misaligned from the respective second peripheral edge by a distance in a range of 2 to 500 micrometers.

In some embodiments, the filter plate is generally washer shaped and comprises an inner rim defining the opening, the inner rim defines a generally circular path and comprises at least one extension that extends radially inward from the circular path, each extension defining a respective keyway notch therein.

According to an aspect, there is provided a method for a stacked-plate filter comprising: providing a plurality of filter plates, each of the filter plates having a respective outer rim, a respective first face and a respective second face opposite the first face, and each of the filter plates defining a respective opening therethrough from the first face to the second face, and the outer rim forms a respective first peripheral edge at the first face and a respective second peripheral edge at the second face, the first peripheral edge being radially misaligned from the second peripheral edge; and arranging the filter plates substantially parallel and spaced apart to define, for each adjacent pair of the filter plates, a respective gap for flow of fluid therebetween from the first and second peripheral edges to the openings of the filter plates, wherein the misaligned first and second peripheral edges form an offset gap interface for each adjacent pair of the filter plates.

In some embodiments, arranging the filter plates comprises mounting the filter plates over a mandrel such that the mandrel extends through the openings of the filter plates.

In some embodiments, for each filter plate, the respective outer rim is tapered from the first face to the second face.

Other aspects and features of the present disclosure will become apparent, to those ordinarily skilled in the art, upon review of the following description of the specific embodiments of the disclosure.

BRIEF DESCRIPTION OF THE DRAWINGS

The present disclosure will be better understood having regard to the drawings in which.

DETAILED DESCRIPTION

Figure 1:
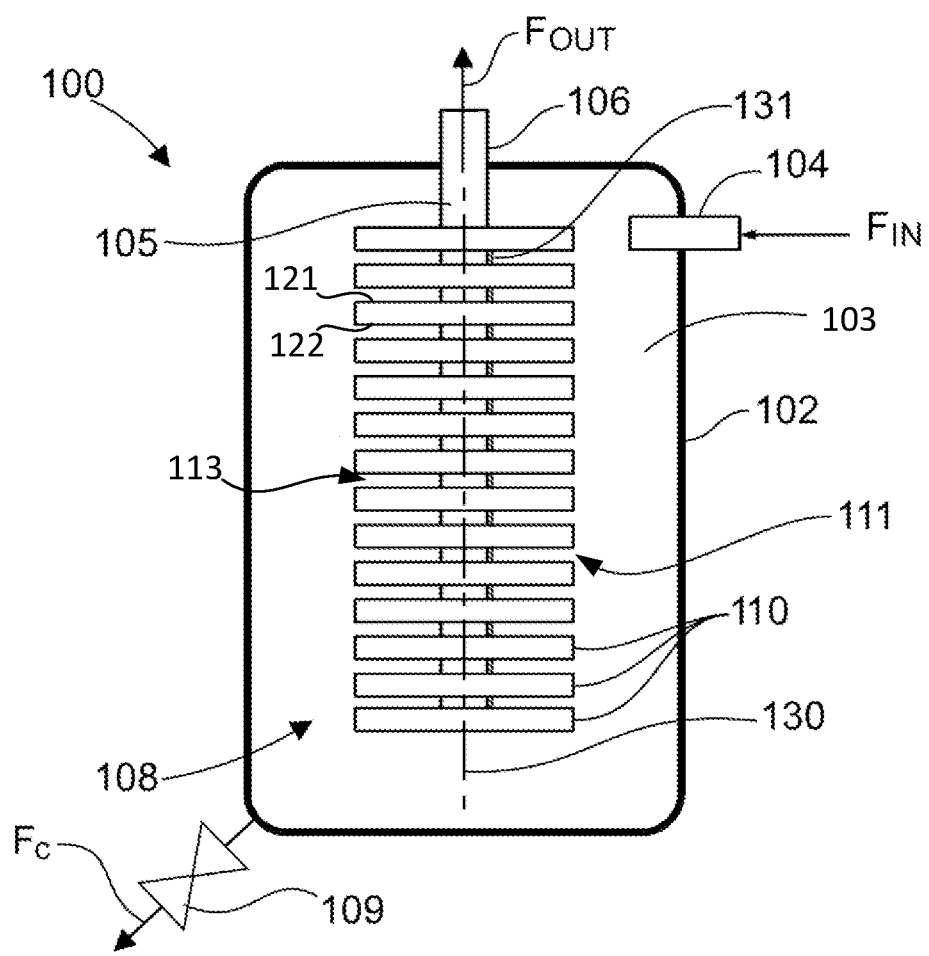
FIG. 1 is a side view of an example filtering apparatus according to some embodiments.

In prior art stacked-plate filters, individual particulates are often received, and become lodged along the aligned and spaced edges of the gap interfaces at the outer periphery of the filter. Applicant noted that this is related to aligned edges of the filter plates imposing retaining forces on the particulates received thereat. The retaining forces are not unlike wedge-type stops (like a door wedge) that functions largely because of the friction generated between the bottom of the door and the wedge, and the wedge and the floor (or other surface). Herein, an analog to the door wedge's floor and door surfaces is provided by the adjacent filter plate's opposing edges, the particulate acting as a wedge in the gap between the two opposing edges. Once a particle is wedged, it may be difficult to remove during the filter cleaning procedure.

Stacked filter plates with gaps therebetween may be provided with pleated outer peripheral edges, with the filter plates being arranged at different angular positions to misalign the pleated outer peripheral edges of adjacent filter plates, thereby providing an offset gap interface. For filters used in some applications with sufficiently large gaps between filter plates, pleated filter plate edges may reduce pressure drop across the filter due to the pleats increasing outer surface area of the filter relative to non-pleated plates. However, in filters with very closely spaced filter plates for filtering fine particulates (e.g. approximately 10s to 100s of micrometer diameters), pleated outer edges have been noted by Applicant to instead increase pressure drop across the filter. This may be due to the variable radial thickness of the plate due to the radial undulations of the pleated outer rims of the plates. It may be desirable to instead maintain a substantially constant pressure drop must be across the entire outer surface of the stacked-plate filter. Thus, it may be desirable to provide a misaligned gap interface between adjacent filter plates without use of pleated outer edges.

According to an aspect of the disclosure, there is provided a filter plate having misaligned outer peripheral edges at opposing first and second faces. The misalignment may be provided by tapering an outer rim. For example, the outer peripheral edge at one face may have a first circumference and the outer peripheral edge at the opposite face may have a second, different circumference. Thus, when multiple like filter plates are stacked, adjacent peripheral edges for each pair of adjacent filter plates may be misaligned. A radial misalignment may thereby be provided without the use of angularly offset pleated outer rims. The offset may be consistent about the entire periphery (e.g. circumference) of the filter plates. Such filter plates may have a significantly lower pressure drop for filters where gaps between filter plates are in the range of 10s to 100s of micrometers for filtering fine particulates (e.g. in oil and gas well applications).

FIG. 1 is a side view of an example filtering system 100 for use in an oil and gas field context. The filtering system 100 receives a multiple phase, high pressure, input feedstream $F_{IN}$ that contains at least one of gas and liquid, as well as entrained particulates. The gas and/or liquid may comprise hydrocarbons. The filtering system 100 may remove particulates from the feedstream and discharge a clean discharged fluid $F_{OUT}$, substantially free from oversized particulates, to downstream equipment. Herein, particulates are used generically for both individual particles and for an agglomeration, collection or other competent groupings of particles or particulates.

The filtering system 100 comprises a housing or vessel 102 having a vessel interior 103, a fluid inlet 104, a fluid outlet 106, and stacked-plate filter 108. The stacked-plate filter 108 is positioned in the vessel interior 103. The input feedstream $F_{IN}$ is injected into the vessel via the fluid inlet 104. The stacked-plate filter 108 is positioned within the vessel 102.

The stacked-plate filter 108 comprises a plurality of filter plates 110. The filter plates 110 are aligned along the central longitudinal axis 130 and stacked axially one adjacent the other. The filter plates 110 each have generally parallel upper and lower faces 121 and 122. The upper and lower faces 121 and 122 of the adjacent filter plates are arranged in parallel, yet spaced, arrangement. Each filter plate 110 of a pair of adjacent filter plates 110 is spaced from the adjacent filter plate to form the respective gap 113 therebetween. The gaps 113 are substantially uniform in size in this embodiment.

The filter plates 110 each define a respective hole or opening (not visible in FIG. 1) therethrough. The openings through the filter plates collectively define a central passage through the filter plates in this embodiment. In this embodiment, the filter plates 110 are optionally mounted on a perforated pipe 105 that extends through the central passage of the filter plates 110. The perforated pipe 105 optionally comprises at least one elongated key 131 running axially along the perforated pipe 105. The hole in each filter plate 110 defines at least one notch (not visible) sized to be received over the key 131, thereby angularly securing the filter plates 110 relative to the perforated pipe 105.

The perforated pipe 105 extends out of the vessel 102 to form the fluid outlet 106 of the filtering system 100. However, the perforated pipe 105 may be in fluid communication with the outlet 106 by means of other structural arrangements. For example, the perforated pipe 105 may be in fluid communication with one or more valves that are, in turn, coupled to the outlet 106. The valves may be arranged for fluid flow at an angel (e.g. 90 degrees) to the longitudinal orientation of the perforated pipe 105. The outlet may be in different positions than shown in FIG. 1. Furthermore, the fluid output from the perforated pipe 105 may instead be coupled to other equipment within the vessel 102. The specific arrangement shown in FIG. 1 is provided simply by way of example. Embodiments are not limited to any particular fluid flow coupling from the perforated pipe 105 to the outlet 106.

The bottom of the perforated pipe 105 may be plugged so that fluid from the feedstream $F_{IN}$ must pass through gaps 113 between adjacent filter plates 110 to reach the fluid outlet 106.

Optionally, a cleanout 109 is provided at or near a bottom of the vessel 102 for removal of filtered particulates $F_C$ that may collect in a bottom portion of the vessel 102

Figure 2:
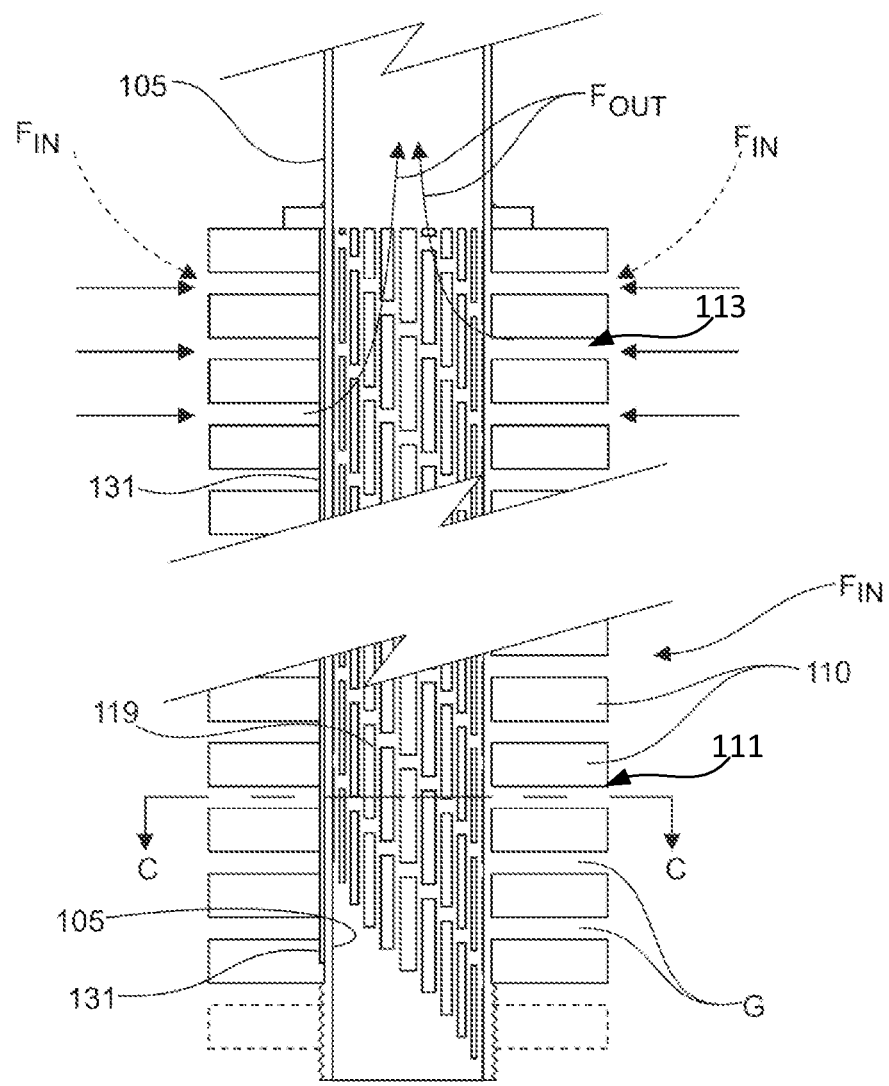
FIG. 2 is a side cross sectional view of a stacked-plate filter of the filtering apparatus of FIG. 1.

FIG. 2 is a side cross sectional view of the stacked-plate filter 108 of the filtering system 100 of FIG. 1. Example perforations 119 in the perforated pipe 105 are illustrated. However, embodiments are not limited to any particular perforation pattern, size or arrangement. Any structure for mounting filter plates in an axially spaced arrangement with a longitudinal passage provided through the filter plates may be used in other embodiments. For example, multiple rods may extend through small holes in the filter plates 110 in other embodiments (in addition to, or in place of, the perforated pipe 105).

Referring to FIG. 2, the fluid from the feedstream $F_{IN}$, passes through the gap interface 111 that is formed at the outer periphery of the gaps 113 by the adjacent filter plates 110. Particulates in the feedstream $F_{IN}$ with a diameter larger than the spacing of the gaps 113 may be blocked by the filter plates 110 and thereby filtered from the fluid flow, thereby producing the filtered fluid $F_{OUT}$. The filtered fluid $F_{OUT}$ enters the perforated pipe 105 and is discharged via the fluid outlet 106 (shown in FIG. 1).

Figure 3:
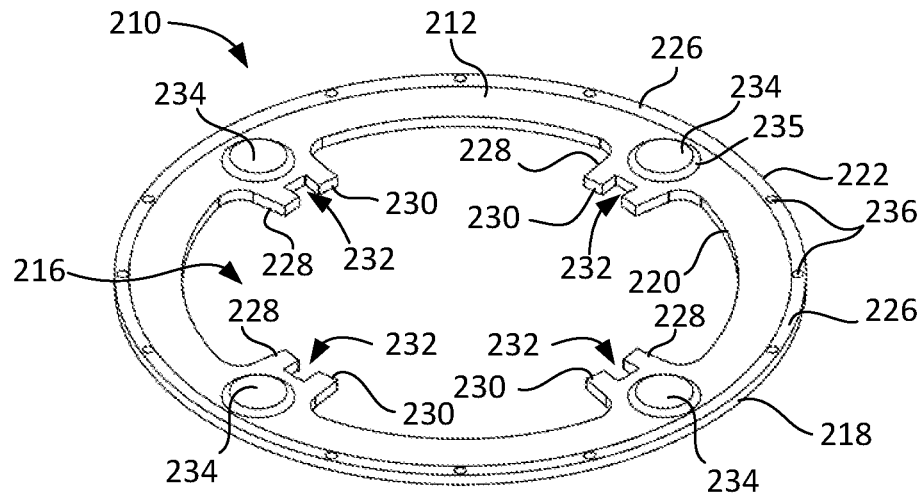
FIG. 3 is a perspective view of an example filter plate for a stacked-plate filter according to some embodiments.
Figure 4:
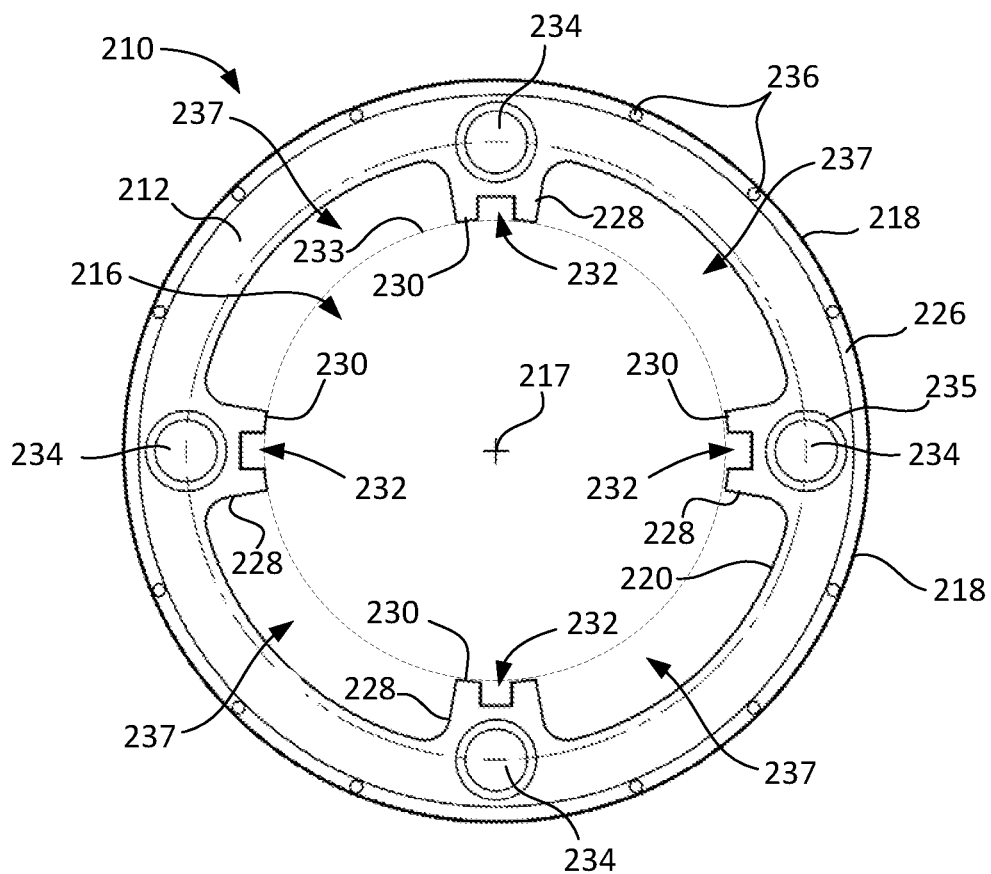
FIG. 4 is a top view of the example filter plate of FIG. 3.
Figure 5:
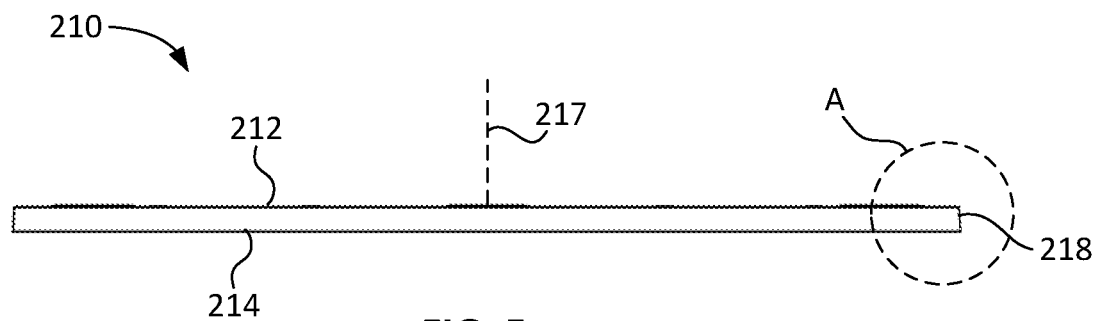
FIG. 5 is a side view of the example filter plate of FIGS. 3 and 4.

FIGS. 3 to 5 are perspective, top and side views, respectively, of an example filter plate 210 for a stacked-plate filter according to some embodiments. The filter plates 110 of the filtering system 100 of FIGS. 1 and 2 may be in the form of the filter plates 210 of FIGS. 3 to 5.

The filter plates 210 in this embodiment are generally planar and washer-shaped. Other embodiments may comprise filter plates of other functionally similar shapes such as discs or conical filter plates (e.g. similar to that used in a conical filter plate centrifuge).

Each annular filter plate 210 has a first face 212 and a second face 214 opposite the first face 212. The first face 212 defines surface features that will be described in more detail below. The filter plate 210 defines an internal opening 216 therethrough, which is optionally centrally located about a central axis 217 of the filter plate. The filter plate 210 has an outer rim 218 that extends about the outer periphery of the filter plate 210. The opening 216 forms an inner rim 220.

Figure 6:
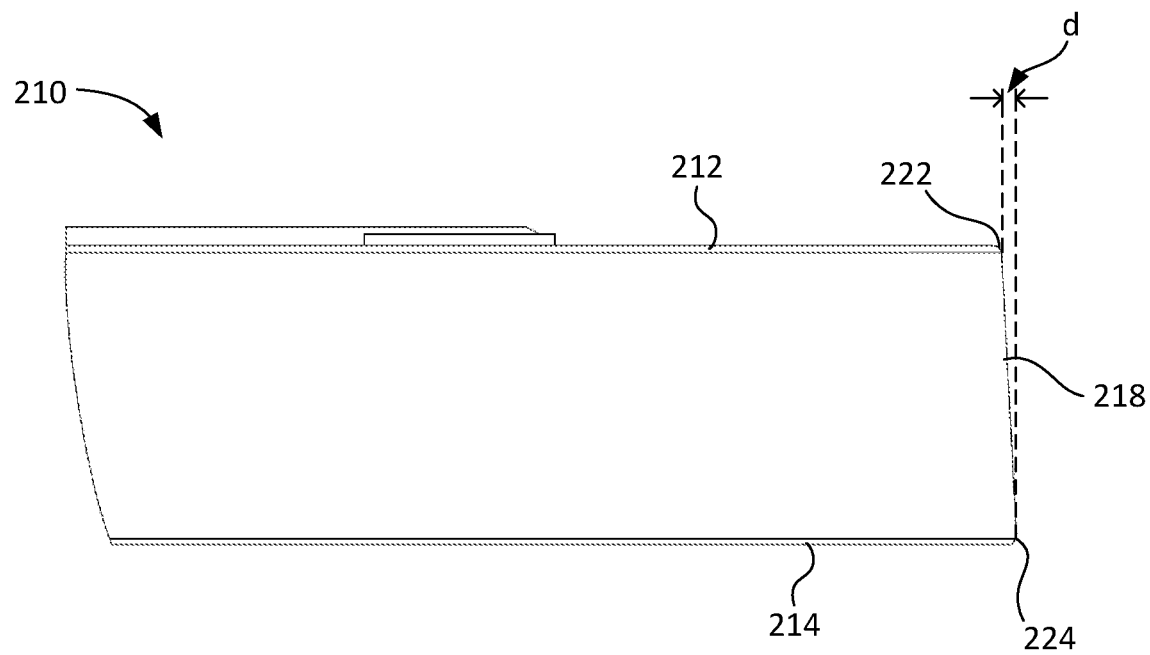
FIG. 6 is an enlarged partial side view of the filter plate of FIGS. 3 to 5.
Figure 8:
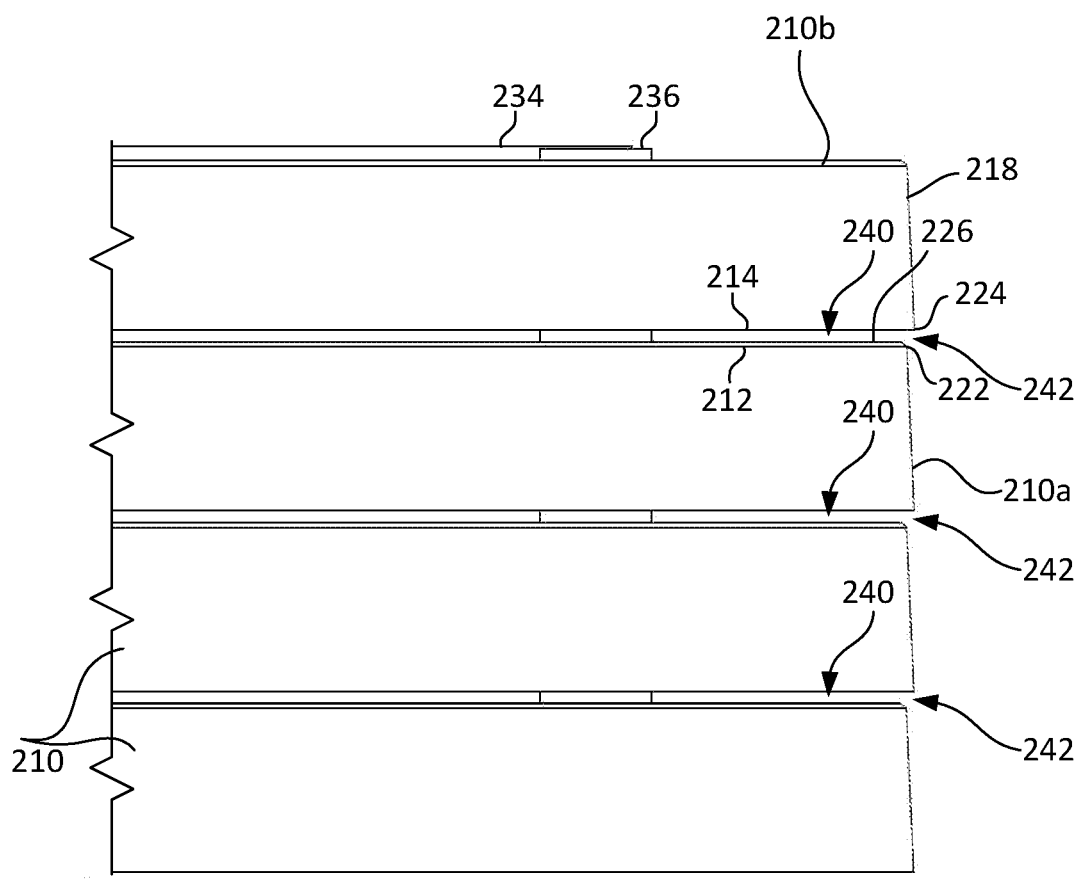
FIG. 8 is an enlarged partial side view of the plurality of the stacked filter plates of FIG. 7.

FIG. 6 is an enlarged partial side view of the portion of the filter plate 210 within circle "A" in FIG. 5. As shown, the outer rim 218 defines a first peripheral edge 222 at the first face 212 and a respective second peripheral edge 224 at the second face 214. The first peripheral edge 222 is radially misaligned from the second peripheral edge 224 by a radial offset distance "d". That is, the first peripheral edge is circular with a first radius, the second peripheral edge is circular with a second radius, and the difference between the first and second radiuses is the offset distance "d". As a result, when two like filter plates 210 are stacked with the first faces 212 facing the same axial direction, the misaligned peripheral edges 222 and 224 of adjacent filter plates will form an offset gap interface 242 (as illustrated in FIG. 8 described below).

The misalignment of the peripheral edges 222 and 224 may create a suitable offset in the gap interface between adjacent filter plates 210 to reduce opposing frictional jamming forces that can retain particulates. The amount of misalignment can vary depending on application and particulates being filtered. The gap may be sized for a mean or average particulate diameter and can vary depending on the particulate distribution expected for the application. The minimum offset distance "d" may be approximately the radius (one half of the diameter) of an expected average of the particulates distribution. Embodiments are not limited to a particular range for the offset distance "d". The offset distance "d" may, for example, be in the range of 2 to 500 micrometers. For example, the offset may be approximately 10 to 100 micrometers or less. The offset may be approximately 5 to 10 micrometers or less in some embodiments (e.g. when filtering fine particulates on the order of approximately 10 to 20 micrometers or less). The offset distance "d" may also be larger than 500 micrometers. Embodiments are not limited to any particular offset distance "d". The offset distance "d" may be approximately one half of the thickness of the inlet gap between adjacent plates 210.

In this embodiment, the radial misalignment of the peripheral edges 222 and 224 is achieved by slightly tapering the outer rim 218. That is, the outer rim 218 is tapered at a slight angle relative to the central axis 217 (shown in FIGS. 4 and 5). The taper may be linear, such that the outer rim tapers at a substantially constant angle. Alternatively, the taper of the outer rim may be curved relative to the central axis 217 or otherwise shaped to provide the misalignment of the peripheral edges 222 and 224 in other embodiments. Embodiments are not limited to a particular shape of the outer rim that provides the radially misaligned peripheral edges.

Turning again to FIGS. 3 and 4, the first face 212 of the filter plate 210 comprises a peripheral or annular lip 226 extends or protrudes slightly from the first face 212 (in the axial direction) to provide a slightly larger filter plate thickness near the outer rim 218. The annular lip 226 extends a short distance inward from the first peripheral edge 222. More particularly, the annular lip 226 is an annular, peripheral shoulder or protrusion that extends axially, optionally perpendicularly, from the first face 212 of the filter plate 210. The annular lip 226 extends entirely around the first peripheral edge 222 in this embodiment.

The filter plate 210 also includes a plurality of keyway extensions 228 that are spaced about the central opening 216 and extend inward from the otherwise generally circular shape of the inner rim 220. In this example, the filter plate 210 comprises four keyway extensions 228 evenly spaced about the opening 216 such that they are positioned every 90 degrees. Each keyway extension 228 has a respective inner-facing end 230. Each end 230 defines a respective keyway notch 232 therein. Each keyway notch 232 is sized and shaped to be received over a key. For example, the filter plate 210 may be mounted on a mandrel (e.g. perforated pipe) having longitudinally extending keys that correspond to and are received through the keyway notches 232.

The filter plate 210 further includes a plurality of spacing pads 234 protruding from the first face 212. Each of the pads 234 includes a respective angled outer periphery 235 that provides a tapered elevation change from the full height of the pads 234 to the height of the first face 212. The taper of the peripheries 235 of the pads 234 may relieve or reduce stress points on the filter plate 210 caused by the pads 234, particularly in resonant frequency vibration scenarios. Thus, the tapered peripheries 235 may reduce the likelihood of damage to the filter plates 210 at the locations of the pads 234. For a linear taper, the taper angle is the arctangent of the offset distance d and the plate thickness. This angle is typically small since the plate thickness (based on strength requirements of the plate) may typically be large relative to the offset distance. Plate thickness may, for example, be in the range of 1 to 5 mm or more. Embodiments are not limited to any particular thickness of the plates 210. In some embodiments, the angle of the taper may be approximately 3 degrees or less relative to the axial direction.

The spacing pads 234 are distributed about first face 212 of the filter plate 210. In this example, each spacing pad is angularly aligned with and positioned adjacent a respective one of the keyway extensions 228. However, the number, spacing and positioning of the spacing pads 234 may vary. The height of the spacing pads 234 (i.e. distance by which the pads 234 protrude from the first face 212) determines the spacing between adjacent stacked filter plates 210. Embodiments are not limited to pads as the means for setting spacing between adjacent filter plates. Any suitable method of maintaining the desired spacing may be used.

Optionally, the filter plate further includes a plurality of nibs 236 protruding from the annular lip 226. The nibs 236 may have heights aligned with the pads 234 such that the nibs 236 may also maintain the desired spacing between adjacent filter plates 210. The nibs 236 may also provide structural support to stacked filter plates 210 by adding stiffness, particularly around the periphery of the filter plate 210 when stacked.

In FIG. 4, stippled circle 233 illustrates the maximum outer diameter of a perforated pipe upon which the filter plate 210 may be received. It may be desirable, however, to have a diameter of the perforated pipe to be less than the diameter of the circle 233 shown to reduce turbulence between the plate and the perforated pipe. The outer diameter of the pipe may be approximately 3 inches or less in some embodiments, but embodiments are not limited to any particular pipe outer diameter or size of the openings 216 in the plate 210.

Figure 7:
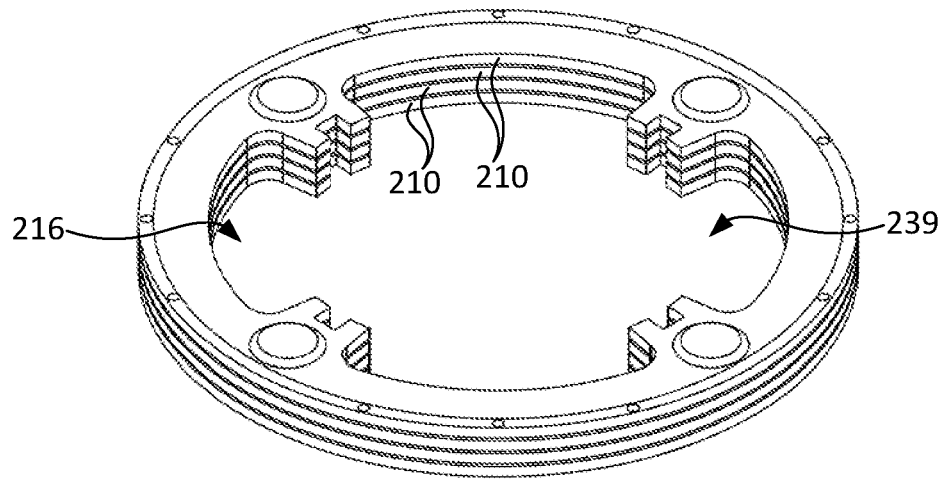
FIG. 7 is a perspective view of a plurality of stacked filter plates of the form shown in FIGS. 3 to 6.

As shown, the opening 216 and extensions 228 create four voids 237 in the annular space between the inner rim 220 of the opening 216 and the circle 233 indicating the pipe position. Each void 237 extends angularly between a respective pair of extensions 228. The voids 237 increase the cross sectional area of the central passage 239 (shown in FIG. 7) created by openings 216 compared to the cross sectional profile of a perforated pipe. When a plurality of filter plates 210 are stacked (as shown in FIGS. 7 and 8), the increased cross-sectional area of the central passage created by stacked openings 216 may in turn slow flow velocity through the central passage. Reducing fluid flow velocity may, in turn, reduce erosion caused by the fluid flow.

In this embodiment, the second face 214 of the filter plate 210 (FIG. 5) a flat, planar surface. In other embodiments, the second face 214 may similarly define a lip, pads and/or nibs similar to the first face 212. However, defining structural features on both faces of a filter plate may double the resulting tolerance error. For example, if a given manufacturing process has a five-micrometer tolerance, then defining structural features on both faces (e.g. lip, pads and/or nibs) may result in a total tolerance of 10 micrometers for the filter plate. Thus, limiting such structural features to the first face 212 may reduce overall discrepancies due to manufacturing tolerance.

FIG. 7 is a perspective view of a plurality of stacked filter plates 210, where each filter plate 210 is of the form shown in FIGS. 3 to 6. FIG. 8 is an enlarged partial side view of the plurality of filter plates 210 in FIG. 7. As shown, the openings 216 of the filter plates 210 are generally aligned and collectively form a central passage 239 that extends axially through the stacked filter plates 210.

As shown in FIG. 8, the filter plates 210 are closely spaced to provide inlet gaps 240 between pairs of adjacent filter plates 210. The inlet gaps 240 may be defined as the axial distance from the lip 226 on the first face 212 of one plate to the flat second surface 214 of the adjacent plate. The filter plates 210 are each oriented with their first face 212 facing the same direction. Thus, for each pair of adjacent filter plates 210, the first face 212 of one filter plate 210 faces the second face 214 of the other filter plate 210. An example pair of filter plates 210a and 210b is labeled in FIG. 8. The spacing pads 234 and nibs 236 of the one filter plate 210a abut the second face 214 of the other filter plate 210b to thereby set the thickness of the inlet gap 240. In order to filter fine particulates from the fluid stream, the inlet gaps 240 may have a thickness in the range of 4 micrometers to 1000 micrometers or more, where the gap thickness is defined as the axial spacing between the plates at the annular lip 226. For example, the inlet gap may have a thickness of approximately 25 to 200 micrometers or less. The gap thickness may 10 to 20 micrometers or less. Larger gaps may also be used, and embodiments are not limited to a maximum or minimum inlet gap thickness or offset distance of the radial misalignment. At such dimensions, surface tension of the fluid flowing against the filter plates 210 may be a much more significant factor in flow characteristics and pressure drop than for stacked-plate filters used in other applications where larger gaps are employed.

For each pair of adjacent filter plates 210, the radial misalignment of the adjacent peripheral edges 222 and 224 forms an offset gap interface 242. See, for example, the offset gap interface 242 for the example pair of filter plates 210a and 210b in FIG. 8. The offset gap interfaces 242 function as inlets for the fluid flow through the filter plates 210 to the central passage within the filter plates 210. Particulates having a diameter larger than the spacing of the inlet gaps 240 are blocked from entering the gap interfaces 242 and flowing between the filter plates. The particulates are thus, filtered from the fluid flow. The offset gap interface 242 may mitigate particulate retention and clogging. The slight radial offset of the peripheral edges 222 and 224 at the gap interface 242 may mitigate or disable opposing frictional jamming forces that otherwise retain particulates.

Tapering the outer rim 218 to provide the radial offset of the peripheral edges 222 and 224 may have advantages over previous methods for providing an offset gap interface. For example, filter plates may be laterally misaligned to provide an offset. However, the offset may not be uniform about the entire periphery of the filter plates due to the lateral misalignment. By contrast, the tapered outer rim 218 shown in FIG. 8 may provide that the offset is consistent about the entire periphery of the filter plates 210. Another previous method of providing an offset includes providing pleats along the outer rim or other radially undulating features, where adjacent filter plates are then angularly misaligned such that the pleated edges are slightly misaligned. Again, such methods may not provide a consistent offset about the entire periphery. Furthermore, pleated edges increase the overall surface area of the outer periphery of the filter plates. For larger dimensioned gaps in other applications, the increase in surface area may decrease pressure drop. However, at gap dimensions in the 10s or 100s of micrometers for filtering very fine particulates, substantially consistent pressure drop across the boundary may be necessary to ensure uniform flow. A pleated outer rim may not result in overly variable flow since the pressure drop at the peaks of the pleats may be different from the troughs of the pleats. By tapering the outer rim 218 (or otherwise providing that the first and second outer peripheral edges of each filter plate 210 are misaligned), the offset may be provided without requiring the outer rim to be pleated or otherwise radially undulating, thereby providing more uniform flow about the circumference of the filter plates 210 and potentially lowering the pressure drop of the stacked-plate filter utilizing the filter plates 210.

The lips 226 of the filter plates 210 (best shown in FIGS. 3 and 4) may have a beneficial effect on boundary layer properties for fluid flow entering the inlet gaps 240 between adjacent filter plates 210. The boundary layer modification caused by the annular lip 226 may reduce or prevent turbulent or laminar flows and substantially lower the pressure drop caused by flow between the filter plates 210. For example, in some applications, the annular lip 226 may reduce the pressure drop across the filter plates 210 to approximately one third of that for similar filter plates without lips. The boundary layer modification effect is discussed in Applicant's co-pending U.S. Patent Application Publication No. 2018/0345180, the entire content of which is incorporated herein by reference. The annular lip 226 may protrude approximately 50 to 100 micrometers from the surrounding surface of the first face 212. The width of the annular lip 226 (i.e. the distance that the annular lip 226 extends inward from the outer rim 218) may vary. Embodiments are not limited to a particular height or width of the annular lip 226.

Figure 9:
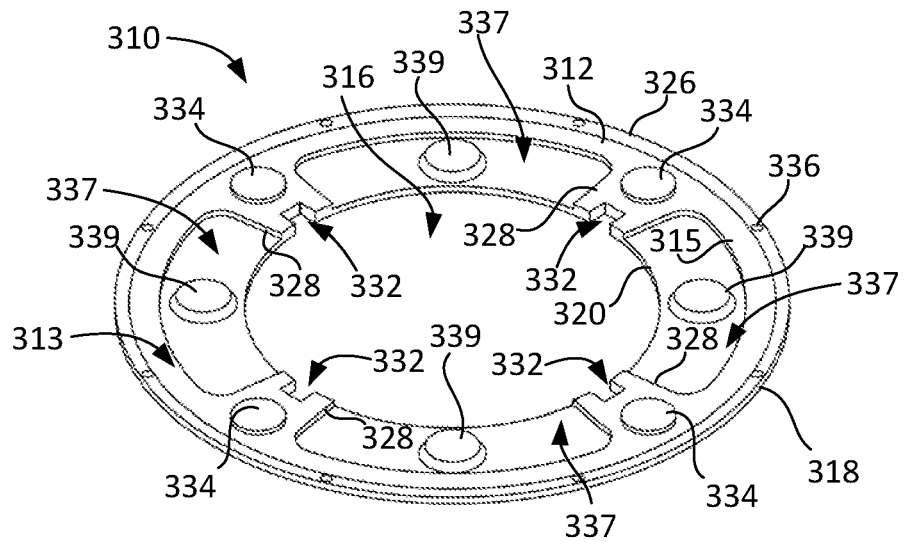
FIG. 9 is a perspective view of another example filter plate for a stacked-plate filter according to some embodiments.
Figure 10:
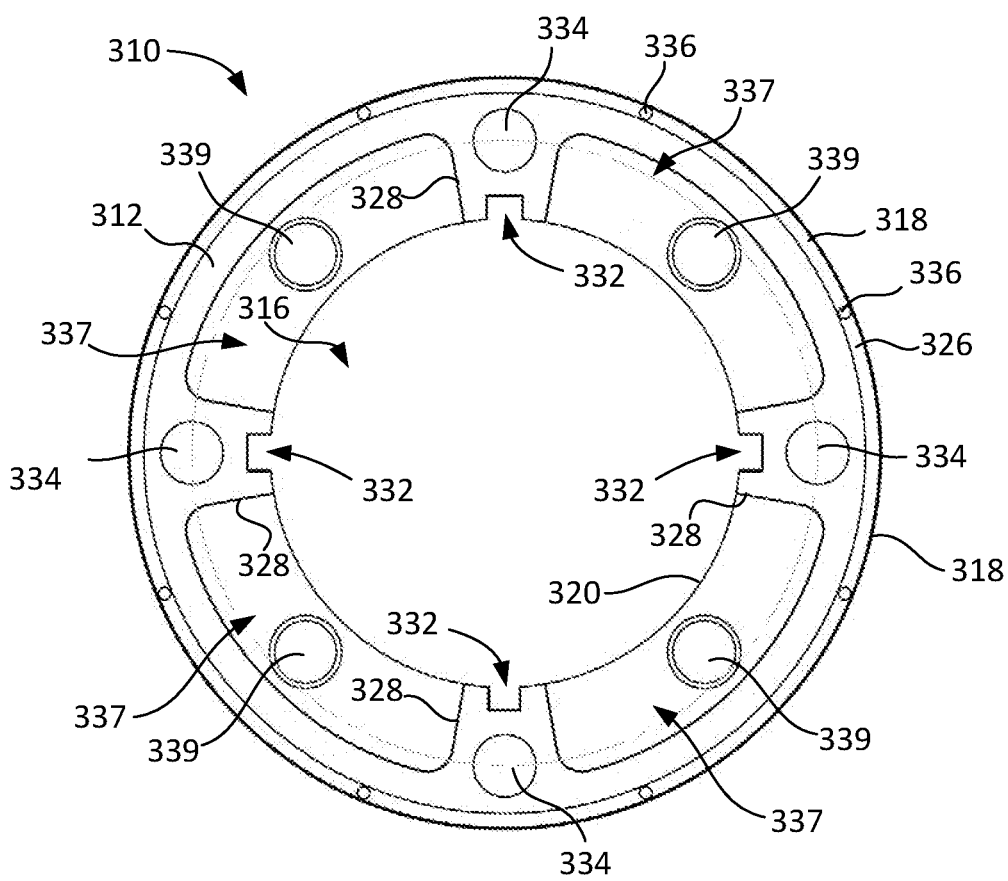
FIG. 10 is a top view of the example filter plate of FIG. 9.

FIGS. 9 and 10 are perspective and top views, respectively, of another example embodiment of filter plate 310 that may be stacked in a stacked-plate filter. The filter plate 310 in FIGS. 9 and 10 is similar to the filter plate 210 of FIGS. 3 to 8 in many respects, and differences will be emphasized below.

Similar to the filter plate 210 in FIGS. 3 to 8, the filter plate 310 in FIGS. 9 and 10 are generally planar and washer-shaped. Each filter plate 310 has a first face 312 and a second face (not shown) opposite the first face 312. The second face may be substantially flat. The filter plate 310 defines a central opening 316 therethrough such that the filter plate 310 has an inner rim 320 about the opening 316 and an outer rim 218 about the outer periphery of the filter plate 310. The central opening also defines keyway notches 332 shaped and positioned similar to the notches 232 of the filter plate 210 in FIGS. 3 to 8.

In this example, the inner rim 320 of the filter plate 310 is generally circular and sized to closely fit abut a perforated pipe onto which the filter plate 310 is received. The filter plate 310 includes a primary ring section 313 that is shaped similar to the filter plate 210. That is, the primary ring section is ring-shaped having an inner rim 315 with keyway extensions 328 extending inward from the inner rim 315, and the notches 332 recessed into the extensions 328. However, rather than voids 237, the filter plate 310 also includes thin, stiff membrane sections 337. The membrane sections 337 have a reduced axial thickness compared to the primary ring section 313. The membrane sections 337 extend between the inner rim 315 of the main ring section 313 and the circular inner rim 320 of the filter plate 310. The membrane sections 337 also extend between the keyway extensions 328 of the primary ring section 313. Thus, the membrane sections 337 fill in spaces similar in shape to the voids 237 of the filter plate 210 in FIGS. 3 and 4. The primary ring section 313 in this example may have a smaller radial thickness (between inner rim 315 and outer rim 318) than the radial thickness of filter plate 210 in FIGS. 3 and 4 (from inner rim 220 to outer rim 218). Optionally, rather than thin membrane sections, those areas may simply have the same thickness as the primary ring section 313 (similar to a traditional washer shape).

The membrane sections 337 in this embodiment may provide additional filter plate compressive strength or collapse resistance by reinforcing the filter plate 210 for hoop stress. However, for higher and/or mainly gas fluid flows, it may be preferable to omit the membrane sections 337. High velocity gas flows may cause such membrane sections 337 to flutter at a resonant frequency, which could cause damage to the filter plates 310. Thus, in such scenarios, the filter plates 210 of FIGS. 3 to 8 with voids 237 may be preferable.

The filter plate 310 first face 312 also defines a peripheral or annular lip 326, pads 334 and nibs 336 (similar to the annular lip 226, pads 234 and nibs 236 of the filter plate 210 shown in FIG. 4). In this example, the membrane sections 337 also define additional spaced apart pads 339 that protrude in the same direction and to the same elevation as the pads 334. Specifically, each membrane section 337 defines a respective pad 339 spaced evenly between two adjacent pads 334 on the extensions 328. The inclusion of additional pads 339 may allow for fewer nibs 336 compared to the filter plate 210 in FIG. 4 while maintaining structural strength and/or stiffness.

Figure 11:
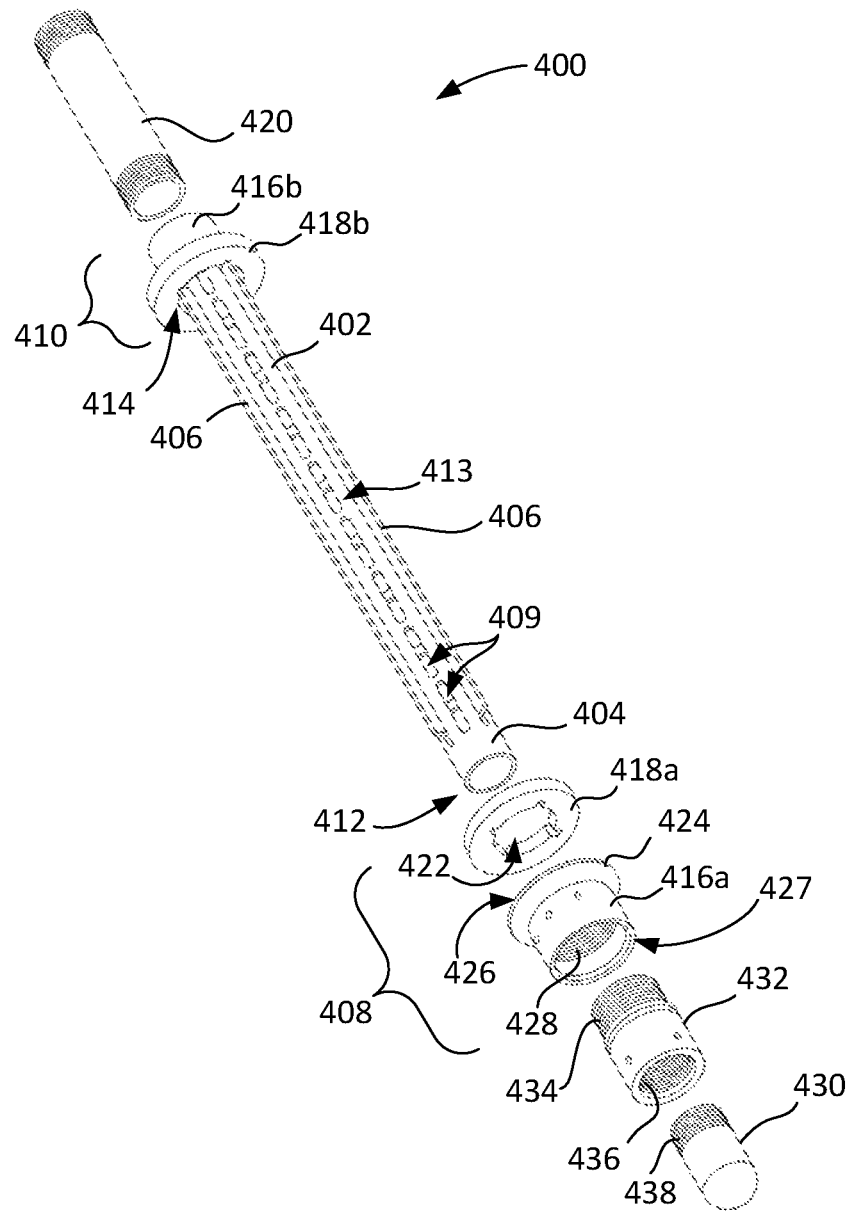
FIG. 11 is an exploded view of an example mandrel assembly for a stacked-plate filter according to some embodiments.

FIG. 11 is an exploded view of an example mandrel assembly 400 for a stacked-plate filter. A plurality of the filter plates 210 shown in FIGS. 4 to 8, or the filter plates 310 shown in FIGS. 9 and 10, may be mounted on the mandrel assembly 400. For example, 50 to 200 of the filter plates 210 or 310 may be mounted in a stacked configuration on the mandrel assembly 400 to form a stacked-plate filter. The length of the mandrel assembly 400 may vary to accommodate various numbers, spacings, and/or thickness of the selected filter plates 210 or 310.

The mandrel assembly 400 comprises a tubular mandrel 402. The example mandrel 402 defines a central bore or passage therethrough and is perforated in this embodiment. Specifically, the tubular mandrel 402 in this example comprises a perforated pipe 404. However, embodiments are not limited to perforated pipes. The mandrel 402 further comprises a plurality of keys 406 extending longitudinally along and protruding from the exterior of the perforated pipe 404. The keys 406 are shaped and positioned complementary to the keyway notches 232 of the filter plate 210 (FIGS. 3 and 4) and/or the keyway notches 332 of the filter plate 310 (FIGS. 9 and 10). Thus, a plurality of filter plates 210 or 310 may be received over the perforated pipe 404 with the keys 406 received through the notches 232 or 332. The keys 406 and notches 232 or 332 may angularly secure the filter plates 210 or 310 about the mandrel 402.

The perforated pipe 404 defines a plurality of perforations 409 therethrough that are spaced and distributed substantially along the length and about the circumference of the perforated pipe 404. In this specific embodiment, a respective set of perforations 409 is arranged between each adjacent pair of keys 406.

The position and shape of the perforations should not impair the axial strength of the mandrel 402. Typically, the axial strength may be preserved by ensuring the perforations 409 are of a shape and in a position aligned along the axis of the mandrel 402. For example, as shown, the perforations 409 are aligned in columns 413 that extend lengthwise (axially) along the mandrel 402. The columns of perforations 409 are spaced apart about the circumference of the mandrel 402. The perforations 409 are axially elongated in this example.

There may be a trade-off between the number and size of the perforations 409 and the structural integrity of the mandrel 402. Increasing the number and/or size of the perforations may reduce wear due to fluid flow but may also reduce structural integrity. In some embodiments, the perforations 409 may account for up to 80% of the total surface area of the pipe 404 while still maintaining sufficient structural integrity.

The mandrel assembly 400 further comprises a first adaptor assembly 408 and a second adaptor assembly 410. The first adaptor assembly 408 is mounted over a first end 412 of the mandrel 402 and the second adaptor assembly 410 is mounted over a second end 414 of the mandrel 402. The mandrel assembly 400 may be generally vertically oriented in use with the first adaptor assembly 408 and first end 412 of the mandrel 402 in a lower position and the second adaptor assembly 410 and second end 414 in an upper position. However, embodiments are not limited to a particular orientation of the mandrel assembly 400.

The first adaptor assembly 408 includes a first sleeve 416a and a first sleeve adaptor 418a. The first sleeve 416a includes a peripheral flange 424 about one end 426. The first sleeve adaptor 418a is generally washer-shaped (i.e. disc-shaped with a hole 422 therethrough). The hole 422 in the sleeve adaptor 418a is sized and notched to have an inner profile complimentary to the outer profile of the perforated pipe 404 and keys 406 of the mandrel 402. The first sleeve 416a is tubular with an inner diameter slightly larger than the outer diameter of the perforated pipe 404. The first sleeve 416a is received over and fixed to the first end 412 of the mandrel 402 with the first sleeve adaptor 418a abutting the flange 424. In this example, the first sleeve 416a includes inner threads 428 that engage outer threads (not shown) at the first end 412 of the mandrel 402.

The mandrel assembly 400 further includes a plug 430 and a plug coupling 432 for coupling the plug 430 to the first adaptor assembly 408. The plug coupling 432 is tubular with a male threaded end 434 and a female threaded end 436. The male threaded end 434 is threaded into the second end 427 of the first sleeve 416a. The plug 430 includes a male threaded end 438 that engages the female threaded end 436 of the plug coupling 432. However, embodiments are not limited to any particular method of connecting the components of the adaptor assembly 408 and mandrel 402.

The first sleeve adaptor 418a may seal against outer surfaces of the mandrel 402 while the plug 430 blocks fluid from flowing out of the first end 412 of the mandrel 402. Thus, fluid flowing into the mandrel 402 through the perforations 409 may flow through the mandrel 402 and out the second (upper) end 414.

The second adaptor assembly 410 includes a second sleeve 416b and second sleeve adaptor 418b that are structurally and functionally similar to the first sleeve 416a and first sleeve adaptor 418a, but positioned over the second end 414 of the mandrel 402.

The mandrel assembly 400 optionally includes pipe 420. The second adaptor assembly 410 interconnects the second (outlet) end of the mandrel 402 and the pipe 420. Fluid output from the mandrel assembly 400 may flow out through the pipe 420. The pipe 420 may be connected directly or indirectly to a filter outlet or to any other equipment to which the filtered fluid is directed. For example, the pipe 420 may be fluidly coupled directly or indirectly to an outlet valve (not shown). The outlet valve may be oriented at approximately 90 degrees relative to the pipe 420.

Figures 12, 13:
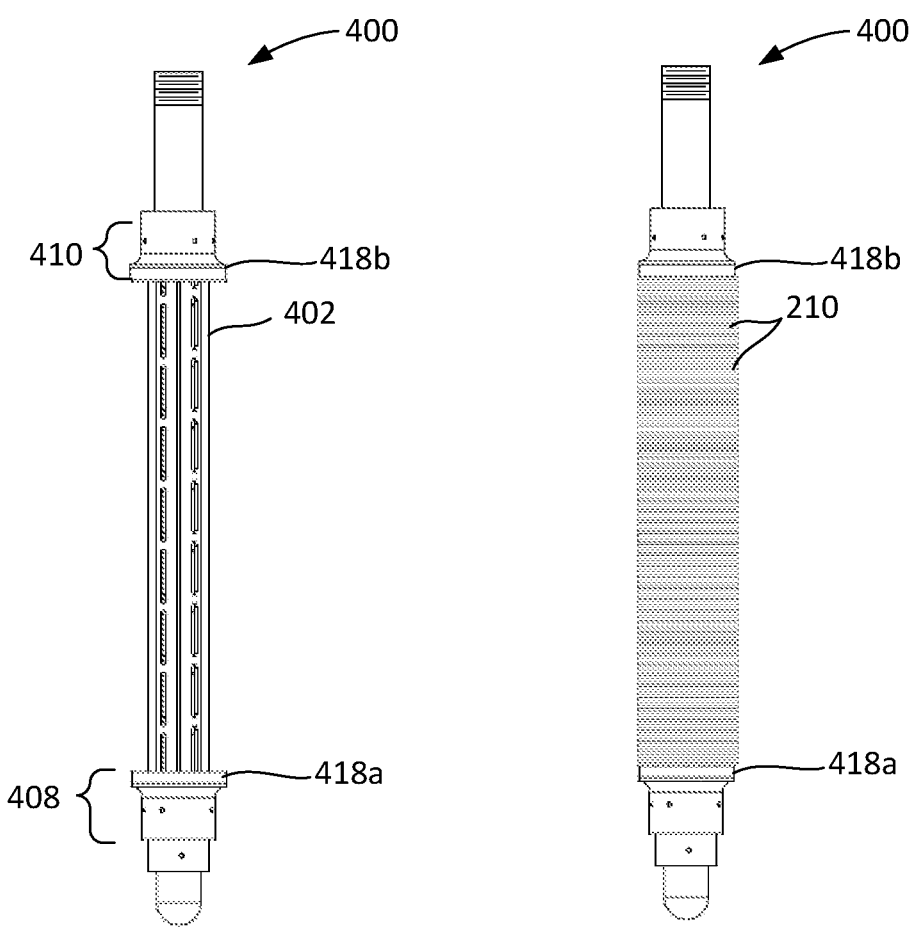
FIG. 12 is a side view of the mandrel assembly of FIG. 11, as assembled.
FIG. 13 is a side view of a stacked-plate filter apparatus including the mandrel assembly of FIGS. 11 and 12 and a plurality of stacked filter plates of the form shown in FIGS. 3 to 8.

FIG. 12 is a side view of the mandrel assembly 400 of FIG. 11, as assembled. Filter plates may be stacked between the first and second sleeve adaptors 418a and 418b of the adaptor assemblies 408 and 410. The mandrel 402 may be approximately 3 feet long in this example, but embodiments are not limited to any particular size.

FIG. 13 is a side view of a stacked-plate filter apparatus 500 including the mandrel assembly 400 of FIGS. 11 and 12 and a plurality of stacked filter plates 210 of FIGS. 3 to 8 received over the mandrel 402 and stacked between the first and second sleeve adaptors 418a and 418b. The filter plates 210 may be compressed together to ensure proper spacing by flattening the filter plates 210. Without sufficient compression, slight deviations due to manufacturing tolerances and/or temperature and/or pressure variations in the operating environment of the filter apparatus 500 may cause variations in gap thickness, which may be undesirable. The compression may be accomplished by threading the sleeves 416a and 416 of the adaptor assemblies onto the mandrel 402 such that the sleeve adaptors 418a and 418b exert compressive force on the stack of filter plates 210 positioned therebetween. The total number of filter plates 210 that may be stacked may be limited by the compression that is applicable to ensure proper gap spacing. Embodiments of stacked-plate filters according to the present disclosure are not limited to the specific filter plates 210 or 310 shown in FIGS. 3 to 10.

Filters of varying lengths and numbers of filter plates may be desired for different implementations. Thus, the overall length of the mandrel upon which filter plates are stacked may vary accordingly in different embodiments.

Figures 14, 15:
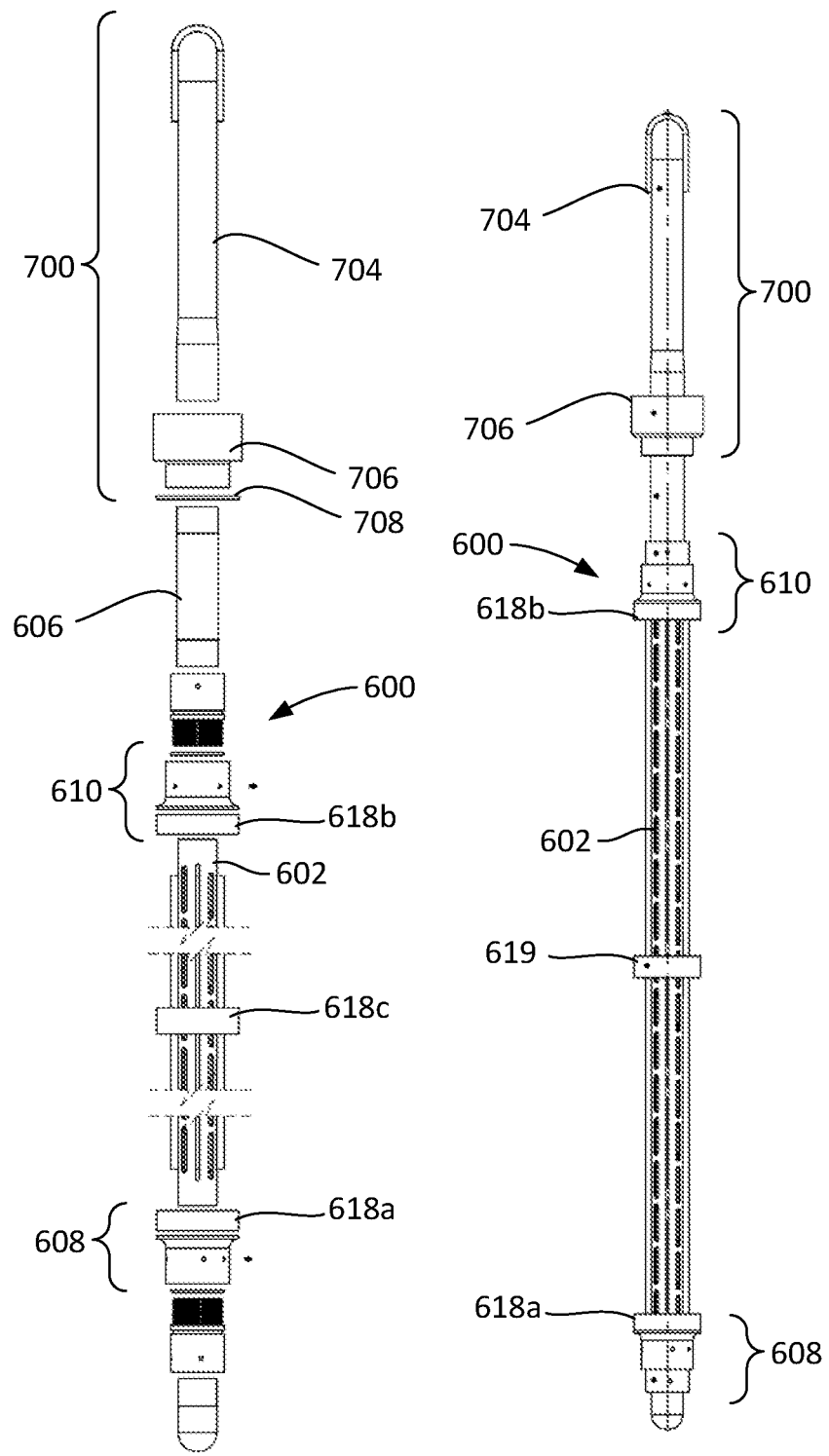
FIG. 14 is an exploded view of another example mandrel assembly for a stacked-plate filter according to some embodiments.
FIG. 15 is a side view of the mandrel assembly of FIG. 14, as assembled.

FIG. 14 is an exploded side of another mandrel system 600 according to some embodiments. FIG. 15 is a side view of the assembled mandrel system 600. FIGS. 14 and 15 also illustrate an example pulling tool assembly 700 that may be used with the mandrel assembly 600. A plurality of filter plates (such as plates 210 and/or 310 shown in FIGS. 3 to 10) may be stacked on the mandrel assembly 600 to provide a stacked-plate filter.

The mandrel system 600 is similar to the mandrel assembly 400 shown in FIGS. 11 and 12 in that it includes a mandrel 602, first adaptor assembly 608 and second adaptor assembly 610 that are structurally and functionally similar to the mandrel 302 and adaptor assemblies 408 and 410 in FIGS. 11 and 12. However the mandrel 602 in FIGS. 14 and 15 is approximately twice as long and may accommodate approximately twice as many filter plates as the mandrel 402 in FIGS. 11 and 12. The mandrel 602 may be approximately 6 feet long in this example, but embodiments are not limited to any particular size.

The more filter plates in a stack, the more difficult it may be to sufficiently compress the stack due to stiction. In this embodiment, an intermediate adaptor 619 is received on the mandrel 602 in a fixed position longitudinally intermediate the first sleeve adaptor 618a and the second sleeve adaptor 618b. The third sleeve adaptor 619 is similar in shape to the first and second sleeve adaptors 618a and 618b and may lower the compression force required to achieve sufficient compression of filter plates stacked on the mandrel 602.

The example pulling tool assembly 700 includes a pulling tool 704 and a hanger 706 that releasably interconnects an upper end of pipe 606 and the pulling tool 704. The pulling tool may be used to position the mandrel assembly 600 and attached plates in a vessel (such as the vessel 102 in FIG. 1).

Once positioned as desired, the pulling tool 704 and hanger 706 may be disconnected from the mandrel assembly 600. An o-ring 708 for sealing the connection between the pipe 606 and the hanger 706 is shown in FIG. 14

The filter plates described herein (including the filter plates 210 and 310 in FIGS. 3 to 10) may be made of a polymer material having a suitable percentage of silica. For example, in some embodiments, the filter plates are made of a polymer material, such as NYLENE® 5133 HST™ having about 33% silica, manufactured by Nylene Canada Inc. In other embodiments, the filter plates are made of a polymer such VYDENE® R533 NTT™ having about 33% silica, manufactured by Ascend Performance Materials of Houston, Texas, United States of America. Embodiments are not limited to a particular material composition of the filter plates or mandrel assembly.

An inert polymer with a silica base may be substantially chemically neutral. Such inert polymer with a silica base may also be up to five times stronger than a stainless steel material and without issues caused with H2S stress cracking or oxidation problems associated with carbon steel. Polymers may also be recyclable.

Those skilled in the art will appreciate that the filter plates may alternatively be made of other suitable materials such as glass, carbon fiber, carbon steel or stainless steel. For oilfield service, desirable material properties include; high compressive strength, strength without brittleness, smooth surfaces to reduce drag, resistance to erosion, resistance to Hydrogen sulfide, carbon dioxide, oilfield chemicals such as acids and surfactants. High content silica polymer has many characteristics that may meet these requirements.

Figure 16:
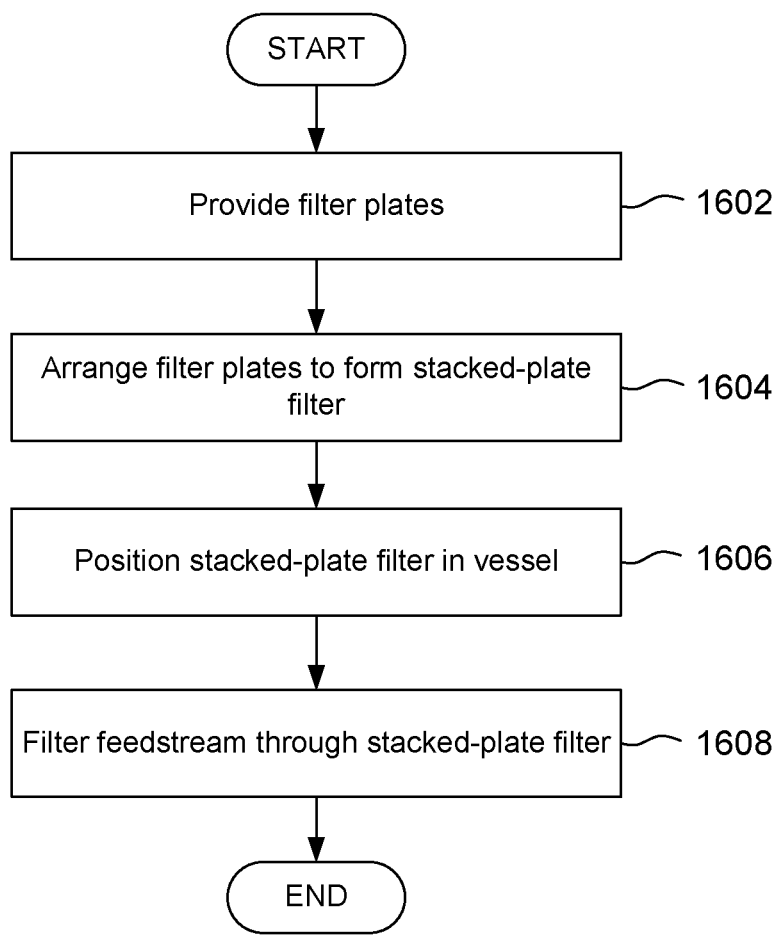
FIG. 16 is a flowchart of an example method for a stacked-plate filter according to some embodiments.

FIG. 16 is a flowchart of an example method for a stacked-plate filter according to some embodiments. At block 1602, a plurality of filter plates is provided. The filter plates may be of the form shown in FIGS. 3 to 10. For example, each of the filter plates may have a respective outer rim, a respective first face and a respective second face opposite the first face. Each of the filter plates may define a respective opening therethrough from the first face to the second face. The outer rim may form a respective first peripheral edge at the first face and a respective second peripheral edge at the second face, where the first peripheral edge is radially misaligned from the second peripheral edge. Providing the filter plates may comprise purchasing, manufacturing, or otherwise obtaining the filter plates. Making the filter plates may comprise providing a generally washer-shaped plate and providing a tapered outer rim, as described herein.

At block 1604, the filter plates are arranged substantially parallel and spaced apart to define, for each adjacent pair of the filter plates, a respective gap for flow of fluid therebetween from the first and second peripheral edges to the openings of the filter plates. The misaligned first and second peripheral edges form an offset gap interface for each adjacent pair of the filter plates.

Arranging the filter plates at block 1604 may comprise mounting the filter plates over a mandrel such that the mandrel extends through the openings of the filter plates. The method may further comprise providing the mandrel. The mandrel may be the example mandrel 402 or 602 of the example mandrel systems 400 and 600 shown in FIGS. 11 to 15.

Optionally, at block 1606, the stacked-plate filter is placed in a vessel that receives a feedstream.

Optionally at block 1608, the feedstream is filtered to remove particulate using the stacked-plate filter. For example, fluid from the feedstream may flow between the stacked plates as described above. It is to be understood that a combination of more than one of the approaches described above may be implemented. Embodiments are not limited to any particular one or more of the approaches, methods or apparatuses disclosed herein.

In some embodiments, a method of filtering a feedstream using a the stacked-plate filter as described herein comprises blocks 1606 and/or 1608 described above.

Relative and/or directional terms including "upper," "lower," "above," "below," and the like, are used for ease of description and generally refer to orientations as used in normal operation. Such terms are not intended to limit embodiments to particular orientations of systems, devices, or components thereof.

The terms "coupled to" or "engaged with" as used herein do not necessarily require a direct physical connection between two "coupled" or "engaged" elements. Unless expressly stated otherwise, these terms are to be understood as including indirect couplings between the two elements, possibly with one or more intermediate coupling elements.

One skilled in the art will appreciate that variations, alterations of the embodiments described herein may be made in various implementations without departing from the scope of the claims.

The invention claimed is:

1. A stacked-plate filter apparatus comprising:
a plurality of circular and planar filter plates stacked along a longitudinal axis with the filter plates substantially parallel, each of the filter plates having a respective outer circular rim, a respective first face and a respective second face opposite the first face, and each of the filter plates defining a respective opening therethrough from the first face to the second face, the respective outer circular rim forming a respective first peripheral edge at the first face and a respective second peripheral edge at the second face,
wherein the filter plates are spaced apart to define, for each adjacent pair of the filter plates, a respective inlet gap for flow of fluid therebetween from the first and second peripheral edges to the openings of the filter plates, the first faces of the filter plates each facing a same axial direction, and
for each filter plate, the second face has a larger outer diameter than the first face, such that the first peripheral edge of the filter plate is radially misaligned from the second peripheral edge of the filter plate to form an offset gap interface for each adjacent pair of the filter plates,
wherein, for each of the filter plates, the respective outer circular rim is tapered from the first face to the second face such that the respective first peripheral edge of the first face is radially misaligned from the respective second peripheral edge of the second face by an offset distance of 2 to 100 micrometers, and a thickness of the inlet gap between each adjacent pair of the filter plates is 10 to 200 micrometers.

2. The stacked-plate filter apparatus of claim 1, wherein the taper is a linear taper.

3. The stacked-plate filter apparatus of claim 1, wherein: the offset distance is approximately half of the thickness of the inlet gap between the adjacent pair of filter plates.

4. The stacked-plate filter apparatus of claim 1, wherein for each filter plate, the plate comprises a respective inner rim defining the opening, the inner rim comprising at least one extension that extends radially inward, each extension defining a respective keyway notch extending from the first face to the second face.

5. The stacked-plate filter apparatus of claim 1, further comprising a mandrel, the filter plates being mounted over the mandrel such that the mandrel extends through the openings of the filter plates.

6. The stacked-plate filter apparatus of claim 5, wherein the mandrel comprises a perforated pipe and at least one longitudinally extending key protruding from an outer periphery of the perforated pipe.

7. The stacked-plate filter apparatus of claim 6, wherein the perforated pipe defines a plurality of perforations arranged and aligned in axially extending columns spaced apart about a circumference of the perforated pipe.

8. A filter plate for a stacked-plate filter, comprising:
a first face and a second face opposite the first face;
an outer circular rim extending about an outer periphery of the filter plate and extending from the first face to the second face; and
the filter plate defining an opening therethrough from the first face to the second face;
wherein the filter plate is circular and planar, the outer circular rim forms a respective first peripheral edge at the first face and a respective second peripheral edge at the second face, and the second face has a larger outer diameter than the first face such that the first peripheral edge is radially misaligned from the second peripheral edge,
wherein the outer circular rim is tapered from the first face to the second face such that the first peripheral edge of the first face is radially misaligned from the second peripheral edge of the second face by an offset distance of 2 to 100 micrometers.

9. The filter plate of claim 1, further comprising an inner rim defining the opening, the inner rim comprising at least one extension that extends radially inward, each extension defining a respective keyway notch extending from the first face to the second face.

10. A method for making a stacked-plate filter comprising:
providing a plurality of circular and planar filter plates, each of the filter plates having a respective outer circular rim, a respective first face and a respective second face opposite the first face, and each of the filter plates defining a respective opening therethrough from the first face to the second face, and the outer circular rim forms a respective first peripheral edge at the first face and a respective second peripheral edge at the second face, and for each filter plate, the second face has a larger outer diameter than the first face, such that the first peripheral edge of the filter plate is radially misaligned from the second peripheral edge of the filter plate; and
arranging the filter plates substantially parallel and spaced apart with the first faces of the filter plates each oriented toward a same axial direction such that the filter plates define, for each adjacent pair of the filter plates, a respective inlet gap for flow of fluid therebetween from the first and second peripheral edges to the openings of the filter plates, wherein the misaligned first and second peripheral edges form an offset gap interface for each adjacent pair of the filter plates,
wherein, for each filter plate, the respective outer circular rim is tapered from the first face to the second face such that for each of the filter plates, the respective first peripheral edge of the first face is radially misaligned from the respective second peripheral edge of the second face by an offset distance of 2 to 100 micrometers, and wherein a thickness of the inlet gap between each adjacent pair of the filter plates is 10 to 200 micrometers.

11. The method of claim 10, wherein arranging the filter plates comprises mounting the filter plates over a mandrel such that the mandrel extends through the openings of the filter plates.

12. The filter plate of claim 8, wherein the taper is a linear taper.

13. The method of claim 10, wherein the taper is a linear taper.

* * * * *